United States Patent [19]
Becker et al.

[11] 3,938,106
[45] Feb. 10, 1976

[54] PRODUCTION DATA GATHERING AND PROCESSING SYSTEM

[76] Inventors: Bernard E. Becker, 675 Serramonte, Marietta, Ga. 30062; Virgil D. Baker, III, 2296 Eastway Road, Decatur, Ga. 30033; Theodore S. Britton, 6900 Castleton Drive, NW., Atlanta, Ga. 30328

[22] Filed: Dec. 4, 1974

[21] Appl. No.: 529,366

[52] U.S. Cl. .......................................... 340/172.5
[51] Int. Cl.² ........................................ G06F 3/04
[58] Field of Search ................................ 340/172.5

[56] References Cited
UNITED STATES PATENTS

| | | | |
|---|---|---|---|
| 3,295,108 | 12/1966 | Harris et al. | 340/172.5 |
| 3,509,539 | 4/1970 | Fichten et al. | 340/172.5 |
| 3,588,832 | 6/1971 | Duncan | 340/172.5 |

*Primary Examiner*—Raulfe B. Zache
*Attorney, Agent, or Firm*—Prangley, Dithmar, Vogel, Sandler & Stotland

[57] ABSTRACT

A data system for gathering and processing data from a production line includes a central processing unit connected to a plurality of addressable data terminals respectively disposed at the work stations of the production line, each terminal having stored therein coded signature data indicating the identification of the work station and the operator. Each work unit being processed on the production line has associated therewith a punched data card containing coded signature data identifying the work unit for insertion in a card reader in the data terminal at each work station to enable a data transmitter therein. When the data terminal is addressed by the control processing unit, the transmitter is actuated for transmitting the work unit, work station and operator signature data to the central processing unit for use through appropriate data retrieval means. Means are provided for indicating improper card insertion in the card reader, improper interval in addressing a data terminal, and abnormality in the production process.

19 Claims, 5 Drawing Figures

PRODUCTION DATA GATHERING AND PROCESSING SYSTEM

BACKGROUND OF THE INVENTION

The present invention relates to a data gathering and processing system and, more particularly to a system for acquiring data with respect to a production line operation on a real time basis.

Prior data acquisition and processing systems have required the reduction of production data to some form of intermediate documentation for input into a computer for processing of the data, thereby entailing considerable delay and preventing efficient use of the computer. Systems which have attempted direct input of production data to the computer from the factory floor by production personnel have required the operator to perform a number of functions to introduce the production data to the system, thereby leading to numerous errors in data input unless the operators were given special training, often with the expenditure of considerable time and money.

In an article entitled "INSTANTANEOUS REPORTING FOR SEWING PRODUCTION? IS IT NEARING REALITY?", appearing in the Apparel Research Journal, December, 1973, page 104, a proposed system of information covering is discussed wherein an operator would pass a light pencil over color bar coding patterns to provide the data input. This system would require considerable care by the operator and would be highly subject to error in the data input. Furthermore, there is provision in the system automatic polling of the individual work stations by a central data processor.

SUMMARY OF THE INVENTION

The present invention is a system for gathering and processing production data on a real time basis without the necessity of documentation of the data for input into a central processing unit and with operator functions reduced to a minimum.

It is a general object of the present invention to provide a system for gathering and processing data from a production line, characterized by direct input of data to the system from the production line by an operator, through a single simple manual operation for each work unit.

In particular, it is an object of the present invention to provide a data gathering system wherein production personnel simply insert a data card into a data terminal at their work station for each work unit on which they work.

An important object of this invention is to provide an addressable data terminal adapted for communication with a central processing unit and being associated with one of a series of work stations of a production line along which travel work units each having a signature data medium associated therewith for travel therewith, the data terminal comprising data input means for acquiring the signature data of each work unit from its data medium when the work unit is at the associated work station, transmitting means coupled to the data input means for transmitting the work unit signature data to the associated central processing unit, and address data receiving means coupled to the data transmitting means for enabling same in response to receipt from the associated central processing unit of an address data signal corresponding to the data terminal.

In connection with the foregoing object, still another object of this invention is to provide an addressable data terminal of the type set forth, which further includes data register means containing constant signature data for the associated work station, the transmitting means being coupled to said data register for transmitting the work station signature data to the associated central processing unit.

In connection with the foregoing objects, still another object of this invention is to provide a system for gathering and processing data from a production line of the character described, the system comprising data media respectively associated with the work units for travel therewith and containing signature data therefor, a plurality of addressable data terminals of the type set forth, a central processing unit including means for sequentially addressing the data terminals on a common communication channel sequentially to actuate the transmitting means thereof for transmitting signature data to the central processing unit, and means for retrieving data from the central processing unit for analysis of the production process.

Further features of the invention pertain to the particular arrangement of the parts of the system whereby the above-outlined and additional operating features thereof are attained.

The invention, both as to its organization and method of operation, together with further objects and advantages thereof, will best be understood by reference to the following specification taken in connection with the accompanying drawings.

DESCRIPTION OF THE PREFERRED EMBODIMENT

Figure 1:
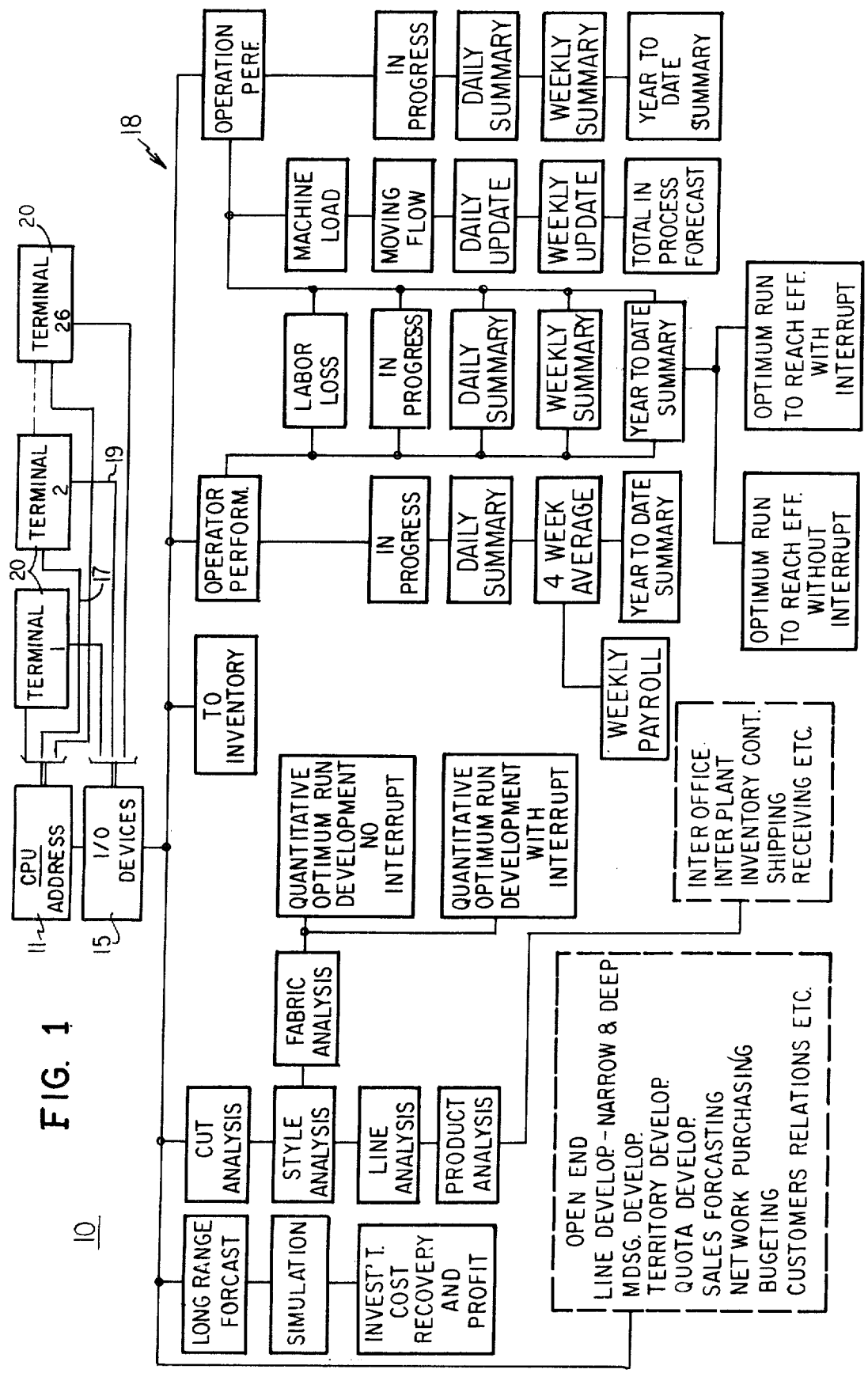
FIG. 1 is a diagrammatic representation of the data gathering system of the present invention, illustrating various formats into which the gathered data might be processed.

Referring now in particular to FIG. 1 of the drawings, there is illustrated a data gathering and processing system, generally designated by the numeral 10, including a central processing unit 11 which may be a computer. Connected to the central processing unit 11 by a common communication channel in the form of a wire line conductor 16 are a plurality of data terminals, each designated by the numeral 20, each terminal 20 being connected to the common line 16 by lines 17. Preferably, the system also includes one or more input/output devices 15 for retrieving data from the central processing unit 11 in any of a number of output data formats, diagrammatically represented in FIG. 1 and generally designated by the numeral 18, depending upon the programming of the central processing unit 11.

The system 10 is designed to operate on a polled, multi-drop basis wherein the communication line 16 is a direct current transmission line, the central processing unit 11 including means for polling the terminals 20 by means of address signals corresponding to each of the terminals 20. While the system 10 is designed primarily for gathering of data from the terminals 20, it will be understood that each of the terminals 20 could also be provided with an input/output device for obtaining data from the central processing unit 11 upon request, the transmission lines 19 being illustrated in FIG. 1 to indicate this function.

The system 10 preferably operates in the fourwire half-duplex discipline, but it may also operate on the two-wire half-duplex discipline.

While it will be understood that the system 10 could be used in general for gathering and processing data from any of a plurality of data input points, for purposes of illustration the system 10 will be described as used for gathering data from the work stations of an apparel manufacturing production process. In such a production process the individual work units comprise bundles of fabric parts, each of which bundles is operated on at each of a series of work stations to produce a finished garment. A number of different production lines may be utilized for respectively producing different types of garments. In such a system, one of the data terminals 20 is located at each work station of the production line for use by the operator working at that station.

Figure 2:
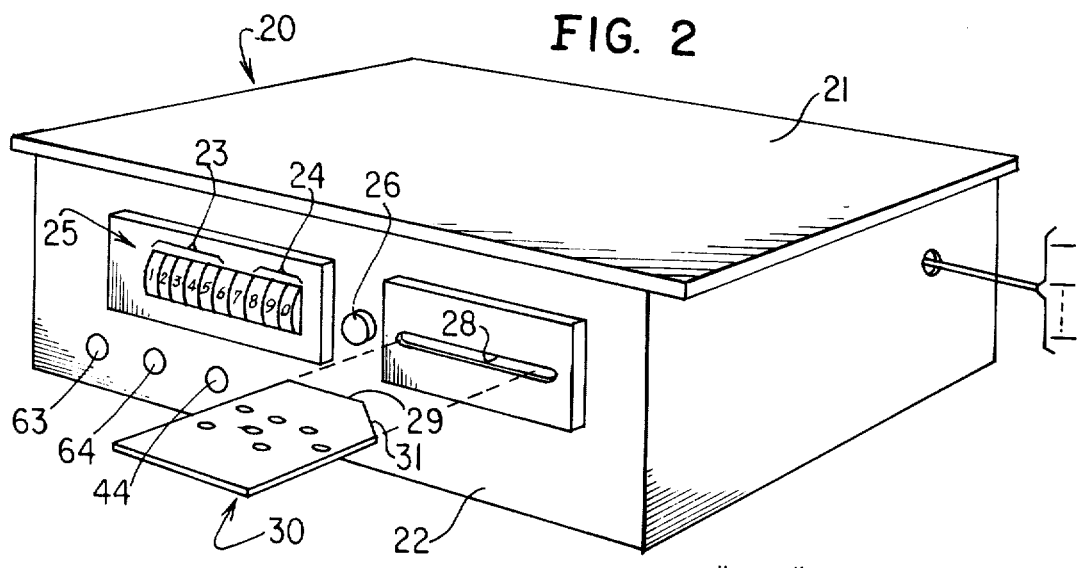
FIG. 2 is a front perspective view of a data terminal constructed in accordance with and embodying the features of the present invention, illustrating the manner of data card insertion.

Referring now to FIG. 2 of the drawings, each of the data terminals 20 is housed in a generally boxlike cabinet 21 preferably formed of steel and having a front wall 22 on which is mounted a plurality of thumb wheel switches, generally designated by the numeral 25, for registering data in the data terminal 20. For illustrative purposes, ten of the thumb wheel switches 25 are shown in FIG. 2, each switch being rotatable among ten positions corresponding respectively to digits 0 to 9. Each switch position produces a binary coded representation of the corresponding digit.

In the preferred embodiment only eight of the thumb wheel switches are used, a group 25 of five of the switches being utilized to register a five-digit operation code number which constitutes a signature or identification for the particular work station and the operation performed at that station. A group 24 of three other thumb wheel switches are used to register a three-digit operator clock number which constitutes a signature or identification for the operator working at the particular work station.

The work station signature number will normally remain constant, but the operator signature number may change relatively frequently, since if the factory runs multiple shifts a different operator will be working at the work station for each shift, and the regular operator may be replaced in the event of illness, vacation or the like. Accordingly, the thumb wheel switches 25 are readily accessible so that the signature numbers registered therein may be changed if necessary. Preferably, these signature numbers set in the thumb wheel switches 25 would be changed only by supervisory personnel, and a key lock 26 may be provided for locking the thumb wheel 25 in position to prevent accidental or unauthorized alteration of the code numbers set therein.

Each work unit or bundle (not shown) has associated therewith a bundle ticket, disclosed in the preferred embodiment of the invention as being a punched data card 30 (see FIG. 2) bearing a coded signature signal for identifying that particular bundle. The data card 30 is attached to or otherwise placed with the work bundle so that it travels with the bundle from station to station along the production line. While a punched data card has been illustrated in FIG. 2 as being the preferred embodiment of the bundle ticket, it will be understood that any other suitable data medium could be used, such as a punched paper tape, a magnetically coded card or tape or the like. The data card 30 has a leading edge 29 with one corner thereof cut off as at 31. The data card 30 is adapted to be inserted through a card insert opening 28 in the front wall 22 of the data terminal 20 for insertion into a standard optical card reader 35 (see FIG. 3) in the data terminal 20.

Figure 3:
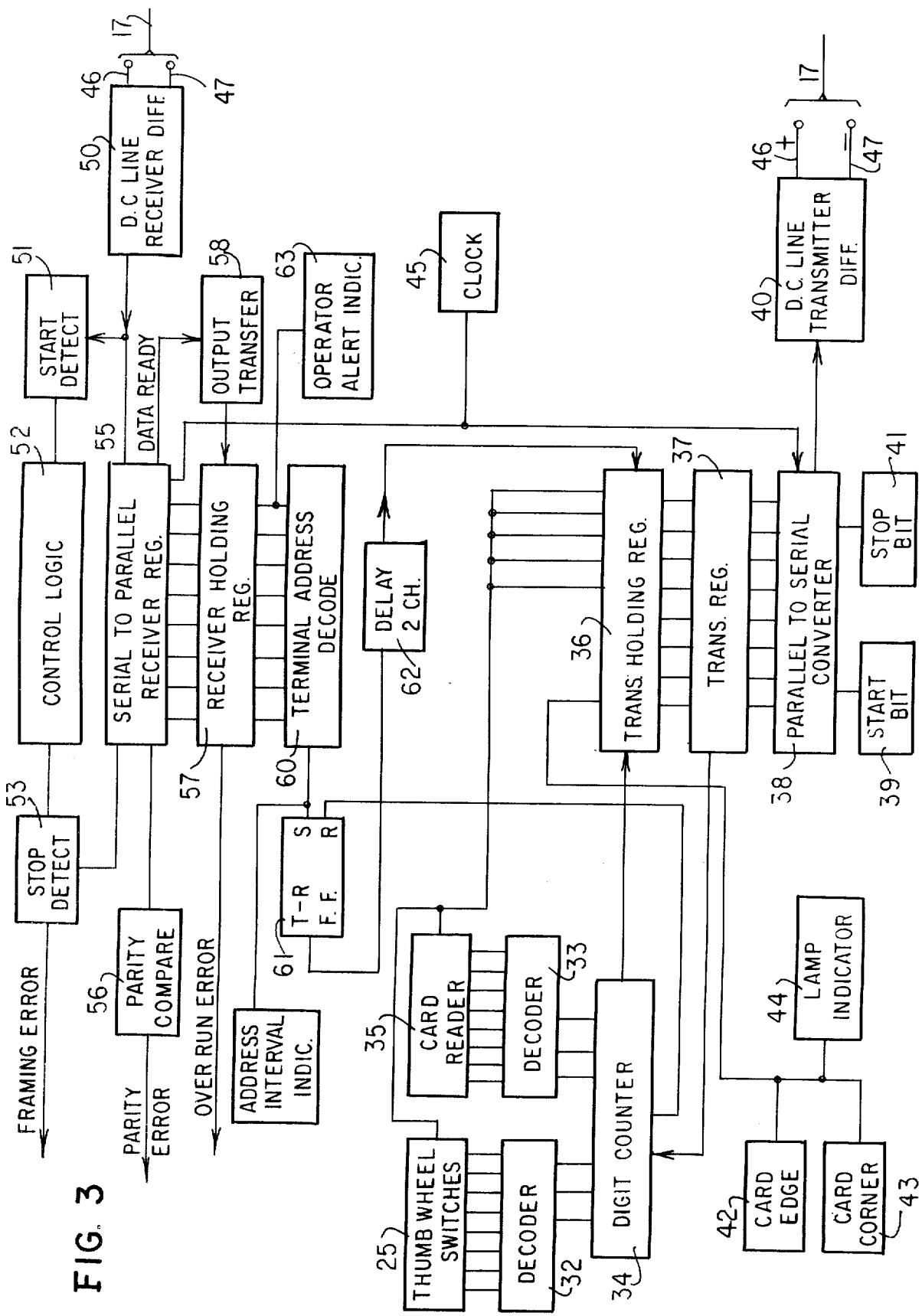
FIG. 3 is a diagrammatic representation of the control circuitry of the data terminal of FIG. 2.

Referring now to FIG. 3 of the drawings, the circuitry of the data terminal 20 is diagrammatically illustrated. Each of the thumb wheel switches 25 produces a binary coded output signal, and the data punched in the data card 30 is also a binary coded representation of a multi-digit decimal number, whereby the card reader 35 also produces a binary coded output. The thumb wheel switches 25 are coupled to a decoder driver 32 while the card reader 35 is coupled to a decoder driver 33, the decoder drivers 32 and 33 each being coupled to a digit counter 34. The thumb wheel switches 25 and card reader 35 are also coupled to a transmit holding register 36, which is in turn coupled to the digit counter 34 and to a transmit register 37. The transmit register 37 is coupled to a parallel-to-serial converter 38 which is in turn coupled to a start bit generator 36 and a stop bit generator 41, the parallel-to-serial converter 38 also being connected to a DC line drive transmitter 40 which is coupled to the conductors 46 and 47 of the corresponding drop line 17 from the common communication line 16. Also provided in the data terminal 20 is a card edge detector 42 and a card corner detector 43 which are each connected to a lamp indicator 44 on the front panel 22 of the data terminal 20 and to the transmit holding register 36.

Also connected to the drop line 17 is a DC line receiver 50 which is in turn coupled to a start bit detector 51 and to a serial-to-parallel receiver register 55. The start bit detector 51 is coupled to control logic 52 which is also coupled to a stop bit detector 53 which is in turn coupled to the serial-to-parallel receiver register 55. The serial to parallel receiver register 55 is also coupled to a parity compare unit 56, a receiver holding register 57 and an output transfer unit 58, the latter also being coupled to the receiver holding register 57. Also coupled to the receiver holding register 57 is a terminal address decoder 60, which is in turn coupled to the "set" input of a transmit-receive flip-flop logic unit 61, the "reset" terminal of which is coupled to the digit counter 34 and the output terminal of which is coupled through a two character delay 62 to the transmit holding register 36. A clock oscillator 45 supplies timing signals to both the parallel-to-serial converter 38 and the serial-to-parallel receiver register 55. One of the bit outputs from the receiver holding register 57 is coupled to an operator alert indicator 63 which includes an indicator lamp mounted on the front of wall or panel 22 of the data terminal 20. The output of the terminal address decoder 60 is also coupled to an address interval indicator 64, which includes an indicator lamp also located on the front panel of the data terminal 20.

Figure 4:
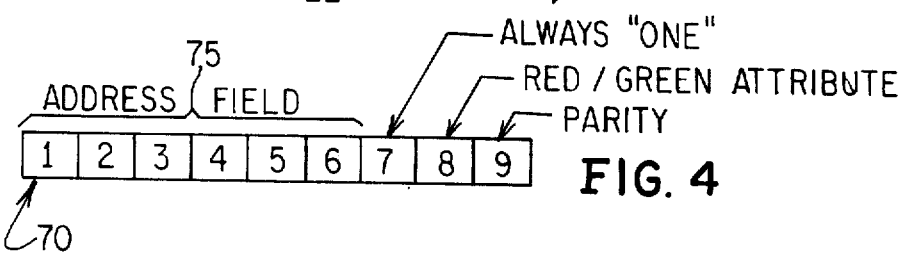
FIG. 4 is a diagrammatic representation of a typical data character for addressing the data terminal of the present invention.

Referring to FIG. 4 of the drawings, the terminal 20 is polled by means of a single character address signal diagrammatically designated by the numeral 70. Preferably the address character comprises a nine bits, six of which comprise the address field 75, whereby 26 addresses are available on any given line or communication channel of the system. One of the bits is always "one", one bit is an attribute bit for controlling the operator alert indicator 63, and one bit is a parity bit for checking the parity in the parity comparison unit 56.

Figure 5:
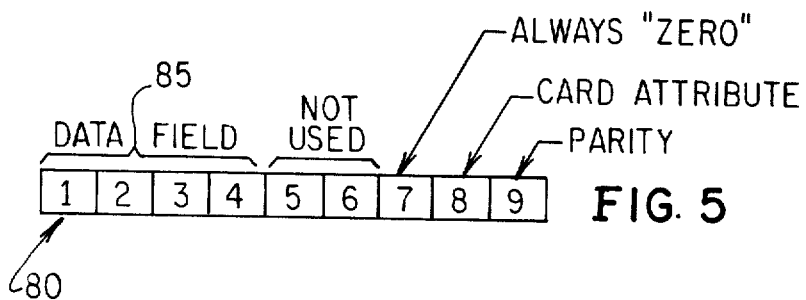
FIG. 5 is a diagrammatic view similar to FIG. 4, illustrating a typical data character for transmitting production data to the central processing unit from the data terminals of the present invention.

The data transmission from the data terminal 20 to the central processing unit 11 in response to the receipt of the address signal for that particular data terminal comprises a 16 character message, each character comprising nine bits and being diagrammatically designated by the numeral 80 in FIG. 5. Four bits of the character 80 comprise the data field 85, one bit is always "zero", one bit is a card attribute bit for indicating whether or not the data card 30 is properly inserted into the card reader, as will be described more fully below, and one bit is a parity bit. The other two bits of the character 80 are not used.

It will be understood that this arrangement will allow up to 64 terminals to be addressed on one line, the direct current driver/receivers being able to support this number of terminals on the same line and still maintain the satisfactory signal-to-noise ratio. Practical data rates for the line driver/receivers used in this configuration are limited to about 2400 baud. Each communication line 16 may be up to 1500 feet long with each terminal drop line 17 preferably not to exceed 15 feet in length. Additional lines 16 may be utilized as needed to accommodate data terminals in excess of 64.

The operation of the data gathering and processing system 10 will now be described in detail. When a bundle or work unit arrives at a given work station on the production line, the operator, before beginning his work operation, inserts the signature data card 30 into the card reader 35 in his data terminal 20. When properly inserted the leading edge 29 in corner 31 of the data card 30 will respectively actuate the card edge detector 42 and the card corner detector 43 for preventing an output signal therefrom, thereby enabling the transmit holding register 36. If the data card 30 is not properly inserted in the card reader 35, either the card edge detector 42 or the card corner detector 43 will produce an output signal which will light the indicator lamp 44 and insert a card attribute bit in the transmit holding register 36. After correct insertion of the data card 30 the operator proceeds to perform his work operation, at the conclusion of which he removes the data card 30 from the card reader 35 and transmits it along with the bundle to the next work station.

The central processing unit 11 will continually poll all of the data terminals 20 on the communication line 16, each data terminal 20 being addressed at intervals of no more than a few seconds. Each address character is received in the DC line receiver 50 and is transmitted to the serial-to-parallel receiver register 55 which produces a parallel by character output to the receiver holding register 57 and in turn to the terminal address decoder 60, where the address code is compared with a preset address assigned to that particular data terminal. If the terminal address decoder 60 identifies the address signal as being the one for that particular data terminal, it produces an output to the transmit-receive flip-flop logic 61, which in turn actuates the transmit holding register 36 after a two character delay.

The start bit detector 51, the stop bit detector 53 and the control logic 52 serve to detect any framing error in the address characters received from the central processing unit 11. The parity bit of the nine bit character output from the serial to parallel receiver register 55 produces an output signal to the parity compare unit 56 for detecting parity error in the address signal. The address character is transmitted from the receiver holding register 57 to the terminal address decoder 60 under the control of the output transfer unit 58 which is in turn controlled by a "data ready" signal from serial-to-parallel receiver register 55.

The attribute bit of the address character from the receiver holding register 57 controls the operator alert indicator 63. Normally, the indicator lamp 63 is green, indicating that there is power to the system, but if the attribute bit is true, it sets an operator alert toggle which causes the power indicator lamp 63 to change color from green to red. If the attribute bit is not true, the toggle will be reset and the lamp will be its normal green. The operator alert indicating lamp 63 might be turned to red for any number of reasons, for example, due to the performing of the same operation on the same bundle twice. Generally the indicating lamp 63 indicates an error either by the operator or by the system.

As indicated above, the central processing unit 11 normally addresses each data terminal 20 periodically. Each time the terminal 20 is addressed with its specific address the address interval indicator 64 is extinguished and an internal timer is reset. If the timer "times out" (for example after ten seconds) prior to another address for that terminal being received, the indicator lamp 64 will light. Thus, it is apparent that in normal operation the lamp 63 will be green and the other lamps will be extinguished. If any of the indicator lamps 44, 63 or 64 is red, it indicates an abnormality and requires some action on the part of the employee. If the card insert indicator 44 is on, the data card 30 need only be properly reinserted. If any of the other indicators is red, the supervisor must be notified. Preferably the indicators 44, 63 and 64 are light-emitting diodes, but it will be understood that any suitable type of lamp or other indicating device could also be used.

When the address signal for the terminal 20 is received and identified, and the transmit holding register 36 is actuated as described above, the contents of the register 36 is transmitted in a parallel by character mode to the transmit register 37 and thence to the parallel-to-serial converter 38. When the data enters the transmit register 37 it produces an output signal which actuates the digit counter 34, which in turn actuates the decoder drivers 32 and 33 for scanning the thumb wheel switches 25 and the card reader 35. During this scanning operation, the 16 digits comprising the work station signature code, the operator signature code and the work bundle signature code are sequentially read out in binary coded form to the transmit holding register 36, where the card attribute bit is added to the character. Each time a character enters the transmit register 37 the digit counter 34 is indexed to read out the next digit from the thumb wheel switches 25 and card reader 35 until the entire 16 character message is completed, at which time the transmit sequence is terminated by an output signal from the digit counter 34 to the transmit holding register 36. A start bit and a stop bit are inserted into each data character in the parallel to serial converter 38 by generator units 39 and 41, the characters being transmitted in a serial by bit form by the DC line transmitter 40.

The data output from the data terminal 20 is stored in a master data memory in the central processing unit 11 for retrieval by appropriate data retrieval means. It is a significant aspect of the present invention that by this simple and virtually fool-proof data gathering technique, whereby each individual operator need only insert a data card into a data reader for each work operation he performs, all the production data analyses indicated in the format blocks generally designated by the numeral 18 in FIG. 1 may be obtained. Thus, the system can provide complete data for production analysis and forecasting, cost analyses, inventory control, payroll and other personnel functions, supervision and engineering.

A built-in feature of the device is that it automatically provides an indication of the amount of time spent on each production operation since the system can record the time at which a data card is inserted in the terminal card reader and the time at which it is removed. Thus, the system provides an indication of the time spent on each operation and the time interval between operations at each terminal. The simplicity of the data input to the data terminals affords a real time production device distinctly oriented and adjusted to employee performance capabilities. This permits unique compatibility with each employee instead of an abstract numerical relationship, enabling analyses of "lost time", automatic payroll functions, and an analysis of employee performance. Thus, the computer may actually recommend overtime and layoffs, addition of skills and schedule enhancement, designate which employee or combination of employees should be assigned to specific tasks, set up practical standard values for peace work and/or incentive programs, set compensation rates and the like. Similarly, the system provides accurate data on a real time basis for production control and planning, and for determining the real time true cost of a product or operation.

All of this data availability on a real time basis is made possible by the unique data terminal 20 of the present invention, which provides a production input device requiring only a single, very simple control insert, namely the punched data card. Basically, all data entries are reduced to a single variable, the thumb wheel register data being basically constant for each individual terminal 20. Furthermore, it can be appreciated that the possibility for error in data entry is minimized with the present invention, since the data insert operation is virtually fool-proof. All the operator needs to do is insert the data card into the card reader. If the card has not been inserted properly, the system will so indicate and the operator simply reinserts it. There is no necessity for the operator to operate any switches, there are no keys, letters or numbers for the operator to read or punch. If the indicator lights indicate that there is a malfunction or an abnormality in the system, the operator calls the supervisor to correct the situation.

It will be understood that the central processing unit 11 may be programmed with any of several different report generating capabilities. For example, the system could be programmed to generate a given report or data analysis on demand or inquiry. In this regard, it is possible, as was indicated above, to have each data terminal 20 provided with an input/output device so that each operator could obtain information from the central processing unit on demand. Alternatively, the system could be programmed to provide a predetermined data analysis or report output automatically at a predetermined time or on the occurrence of a predetermined event.

From the foregoing, it can be seen that there has been provided a unique data gathering and processing system which has a novel data terminal, the system permitting the elimination of timekeepers, payroll clerks and the like and affording a real time analysis of a production operation.

There has also been provided a real time data gathering system which affords simple and virtually fool-proof data input by the production line operator through the simple insertion of a punched data card into a card reader.

There has also been provided a unique data terminal for use in such a data gathering system, the data terminal providing constant data registers for identifying the work station and the operator and other constant data pertaining to the particular work operation, and a single variable data input corresponding to each workpiece or work unit operated on at the work station.

While there has been described what is at present considered to be the preferred embodiment of the present invention, it will be understood that various modifications may be made therein, and it is intended to cover in the appended claims all such modifications as fall within the true spirit and scope of the invention.

What is claimed is:

1. A system for gathering and processing data from a production line along which work units sequentially undergo a plurality of different operations respectively performed at a plurality of work stations, said system comprising data media respectively associated with the work units for travel therewith and containing signature data therefor; a plurality of addressable data terminals equal in number to and respectively disposed at the work stations and being coupled to a common communication channel; each of said data terminals including data input means for acquiring the signature data of each work unit from its data medium when the work unit is at the associated work station, transmitting means coupled to said data input means for transmitting the work unit signature data on the communication channel, and address data receiving means coupled to said data transmitting means for actuating same in response to receipt on the communication channel of an address data signal corresponding to that data terminal; a central processing unit including means for sequentially addressing said data terminals on the common communication channel sequentially to actuate said transmitting means thereof for transmitting signature data to the central processing unit; and means for retrieving data from said central processing unit for analysis of the production process.

2. The system set forth in claim 1, wherein the common communication channel between said central processing unit and each of said data terminals is a wire line connection.

3. The system set forth in claim 1, wherein said data medium for each work unit comprises a punched data card, said data input means comprising an optical card reader.

4. The system set forth in claim 1, wherein said data medium for each work unit comprises a punched data card, said data input means comprising an optical card reader, and further including sensing means for indicating whether said data card is properly aligned with said card reader during a card reading operation.

5. A system for gathering and processing data from a production line along which work units sequentially undergo a plurality of different operations respectively perform at a plurality of work stations, said system comprising data media respectively associated with the work units for travel therewith and containing signature data therefor; a plurality of addressable data terminals equal in number to and respectively disposed at the work stations and being coupled to a common communication channel; each of said data terminals including data input means for acquiring the signature data of each work unit from its data medium when the work unit is at the associated work station, data register means containing constant signature data for the associated work station, transmitting means coupled to said data register means and to said data input means for transmitting the work station signature data and the work unit signature data on the communication channel, and address data receiving means coupled to said data transmitting means for actuating same in response to receipt on the communication channel of an address data signal corresponding to that data terminal; a central processing unit including means for sequentially addressing said data terminals on the common communication channel sequentially to actuate said transmitting means thereof for transmitting signature data to the central processing unit; and means for retrieving data from said central processing unit for analysis of the production process.

6. The system set forth in claim 5, wherein said data register comprises a set of manually operable selector switches for respectively dialing the digits of a multi-digit code number corresponding to said data terminal.

7. The system set forth in claim 5, wherein said data register comprises a set of manually operable selector switches for respectively dialing the digits of a multi-digit code number corresponding to said data terminal, and further including a key switch for locking said selector switches against movement.

8. The system set forth in claim 5, wherein said data medium for each work unit comprises a punched data card, said data input means comprising an optical card reader.

9. The system set forth in claim 5, wherein said transmitting means includes timing means for providing an indication when the interval between receptions by said data terminal of its address data signal exceeds a predetermined interval.

10. An addressable data terminal adapted for communication with a central processing unit and being associated with one of a series of work stations of a production line along which travel work units each having a signature data medium associated therewith for travel therewith, said data terminal comprising data input means for adquiring the signature data of each work unit from its data medium when the work unit is at the associated work station, transmitting means coupled to said data input means for transmitting the work unit signature data to the associated central processing unit, and address data receiving means coupled to said data transmitting means for actuating same in response to receipt from the associated central processing unit of an address data signal corresponding to said data terminal.

11. The data terminal set forth in claim 10, wherein the data medium associated with each work unit is a punched data card, said data input means comprising an optical card reader.

12. The data terminal set forth in claim 10, wherein the data medium associated with each work unit is a punched data card, said data input means comprising an optical card reader, and further including sensing means for indicating whether said data card is properly aligned with said card reader during a card reading operation.

13. An addressable data terminal adapted for communication with a central processing unit and being associated with one of a series of work stations of a production line along which travel work units each having a signature data medium associated therewith for travel therewith, said data terminal comprising data input means for acquiring the signature data of each work unit from its data medium when the work unit is at the associated work station, data register means containing constant signature data for the associated work station, transmitting means coupled to said data register means and to said data input means for transmitting the work station signature data and the work unit signature data to the associated central processing unit, and address data receiving means coupled to said data transmitting means for actuating same in response to receipt from the associated central processing unit of an address data signal corresponding to said data terminal.

14. The data terminal set forth in claim 13, wherein said data register comprises a set of manually operable selector switches for respectively dialing the digits of a multi-digit code number corresponding to said data terminal.

15. The data terminal set forth in claim 13, and further including means for providing an indication when the interval between receptions by said data terminal of its address data signal exceeds a predetermined interval.

16. The data terminal set forth in claim 13, wherein said address data receiving means includes means for detecting an error in the data address signal received from the associated central processing unit.

17. An addressable data terminal adapted for communication with a central processing unit and being associated with one of a series of work stations of a production line along which travel work units each having a signature data medium associated therewith for travel therewith, said data terminal comprising data input means for acquiring the signature data of each work unit from its data medium when the work unit is at the associated work station, data register means containing constant signature data for the associated work stations, a data transmitter coupled to said data register means and to said data input means for transmitting the signature data to the associated central processing unit, scanning means coupled to said data register means and to said data input means and to said data transmitter sequentially to pass the work station signature data and the work unit signature data to said data transmitter one character at a time, an address data receiver for receiving encoded address data from the associated central processing unit, address data decoding means coupled to said address data receiver and to said data transmitter for decoding and identifying address data received from the associated central processing unit, said address data decoding means being responsive to receipt of an address data signal corresponding to said data terminal for actuating said data transmitter.

18. The data terminal set forth in claim 17, wherein said data transmitter means includes means for converting the signature data from parallel form to serial form, said address data receiver including means for converting said address data signal from serial form to parallel form.

19. The data terminal set forth in claim 17, and further including means responsive to said address data decoding means for delaying the actuation of said data transmitter for two data characters after receipt of the address data signal corresponding to said data terminal.

* * * * *